Oct. 29, 1935.   B. KERN   2,018,791
PNEUMATIC CLEANER
Filed Oct. 20, 1930   14 Sheets-Sheet 2
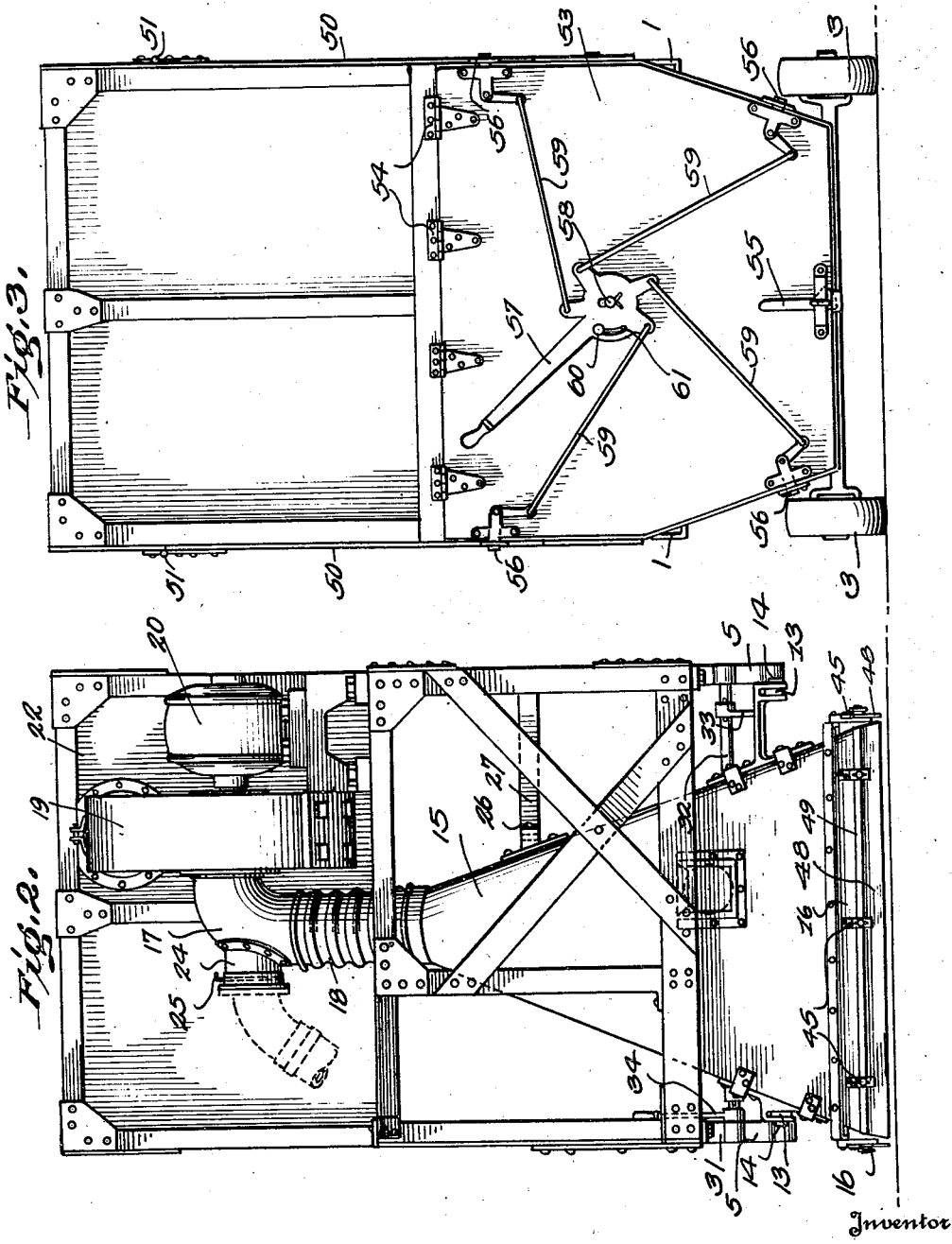
Inventor
*Bernard Kern*
By *Milans & Milans*
Attorneys

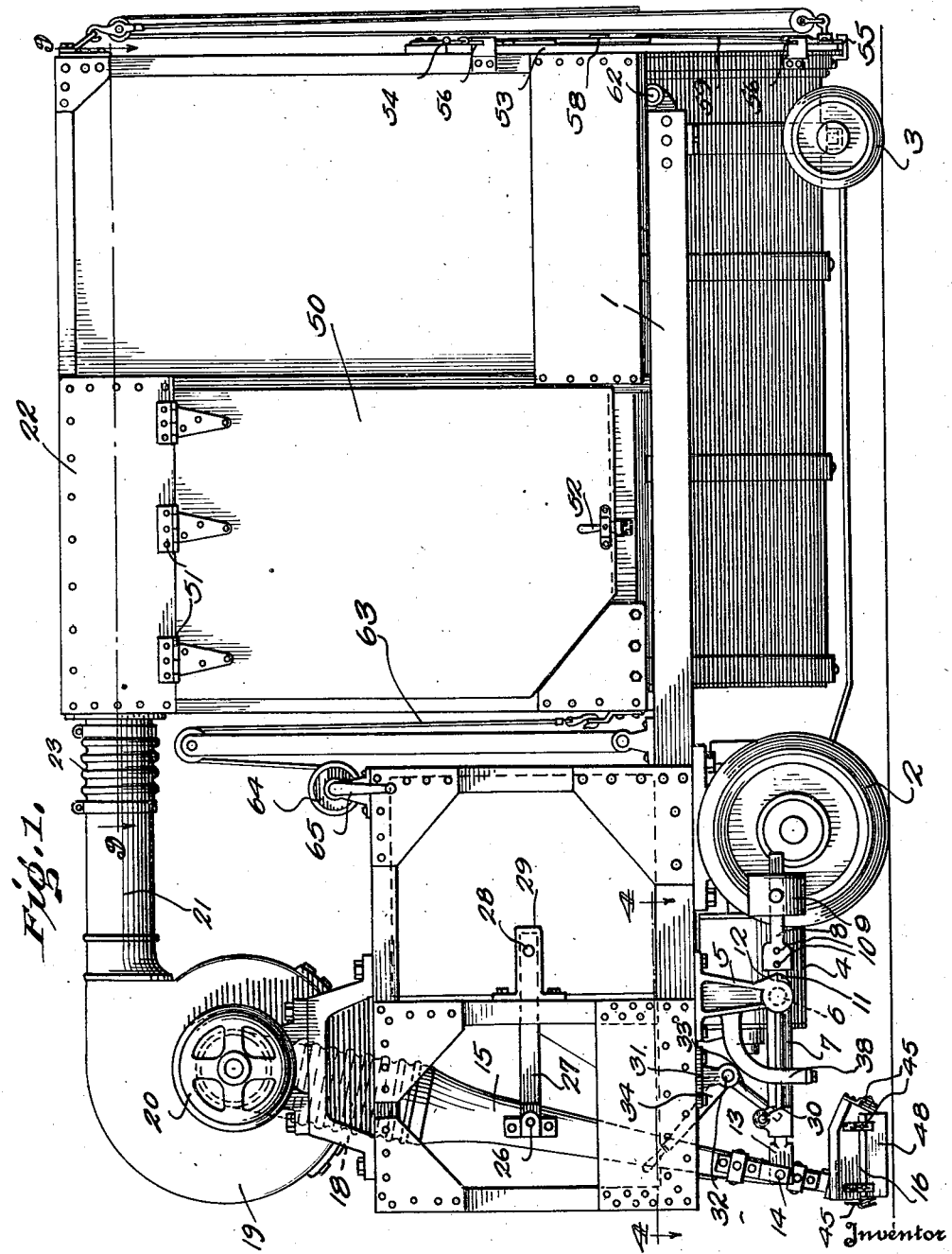

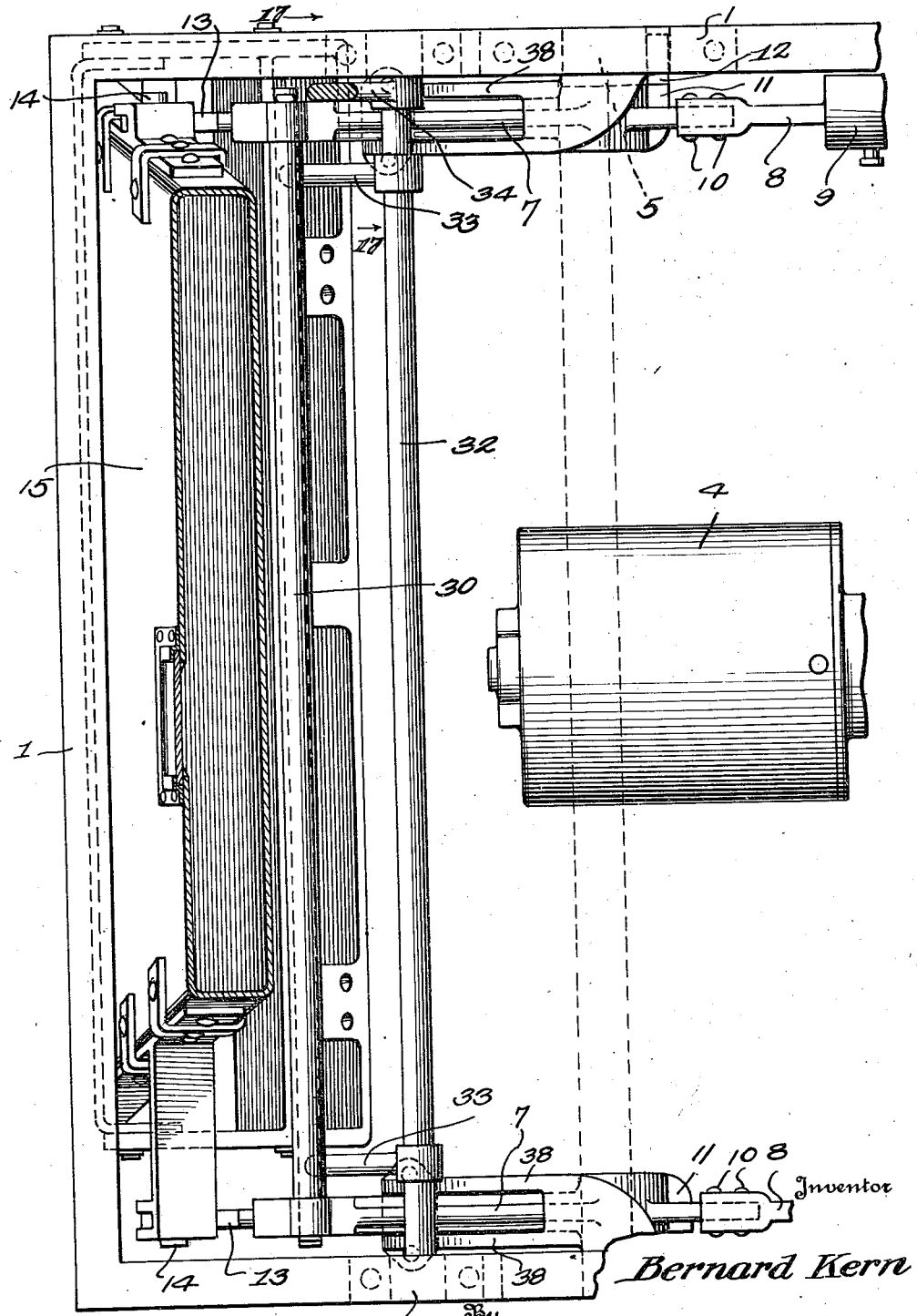

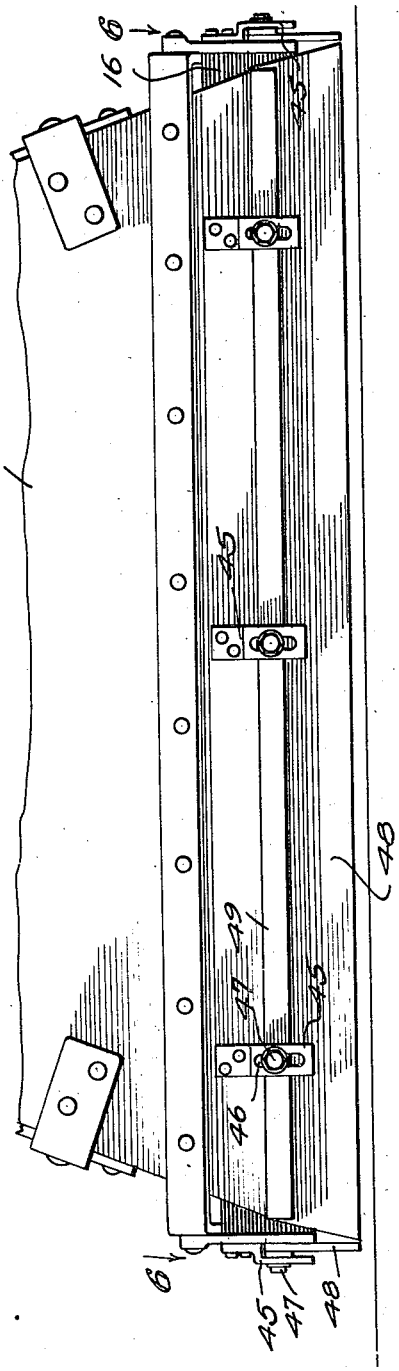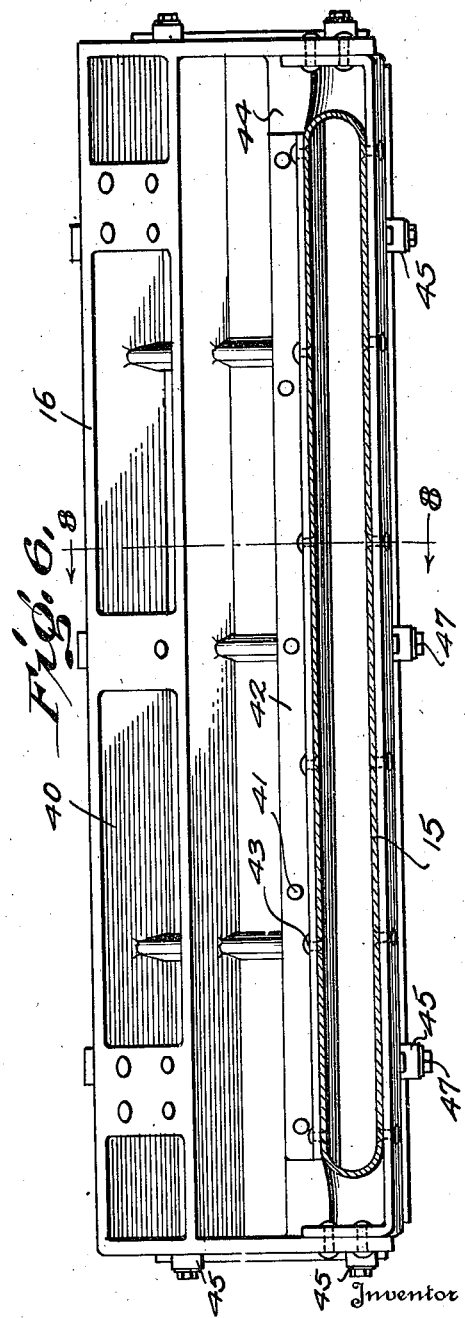

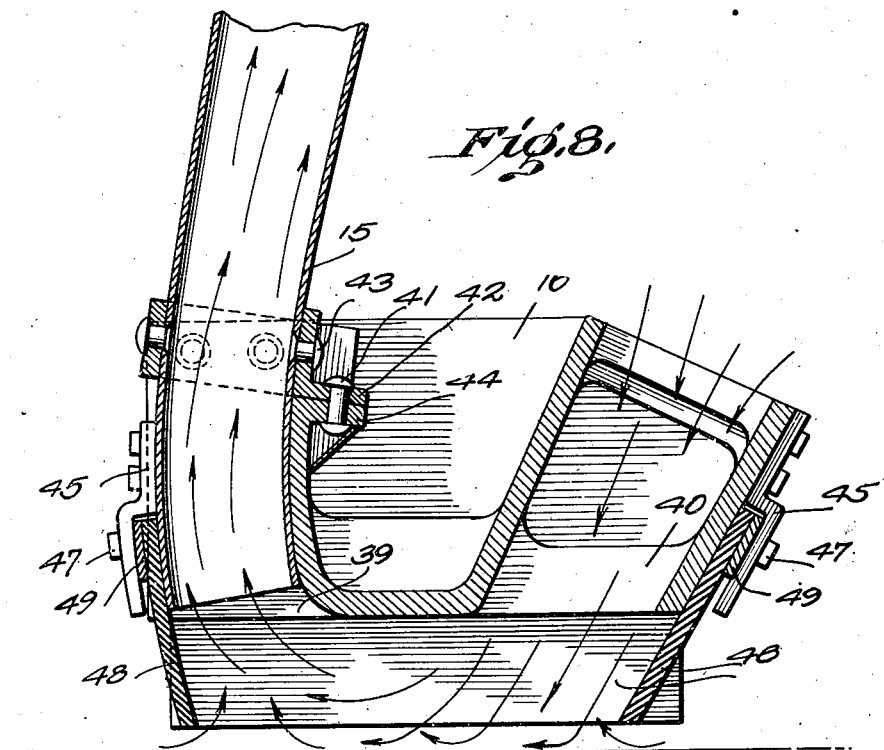
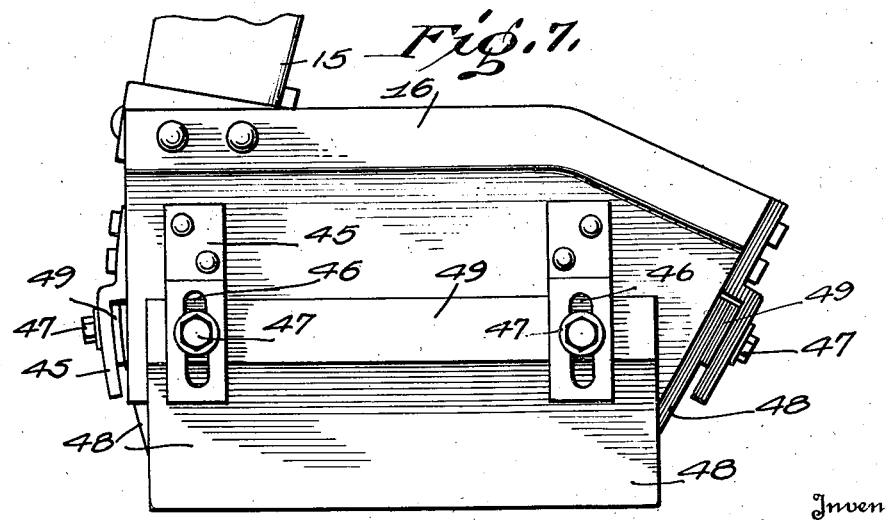

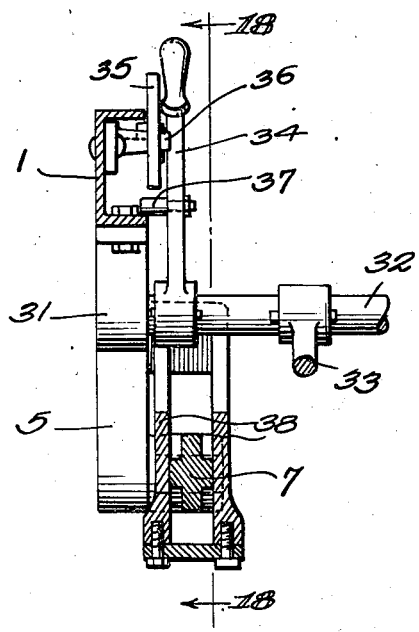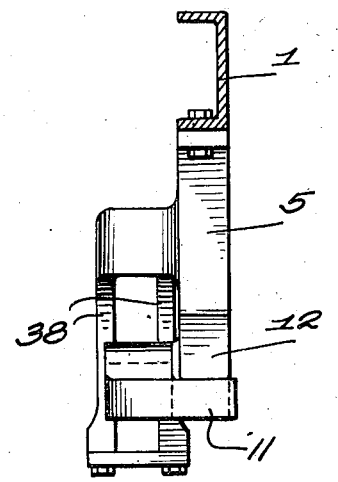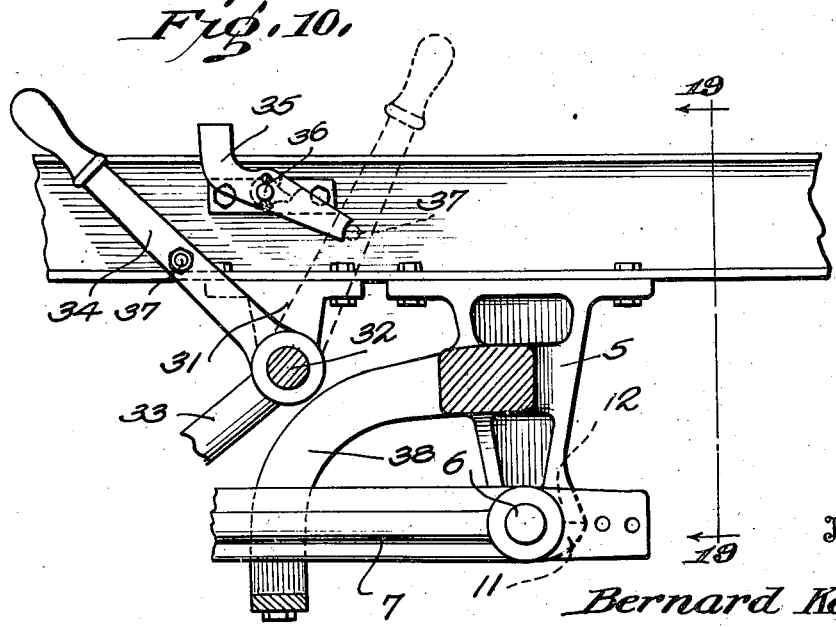

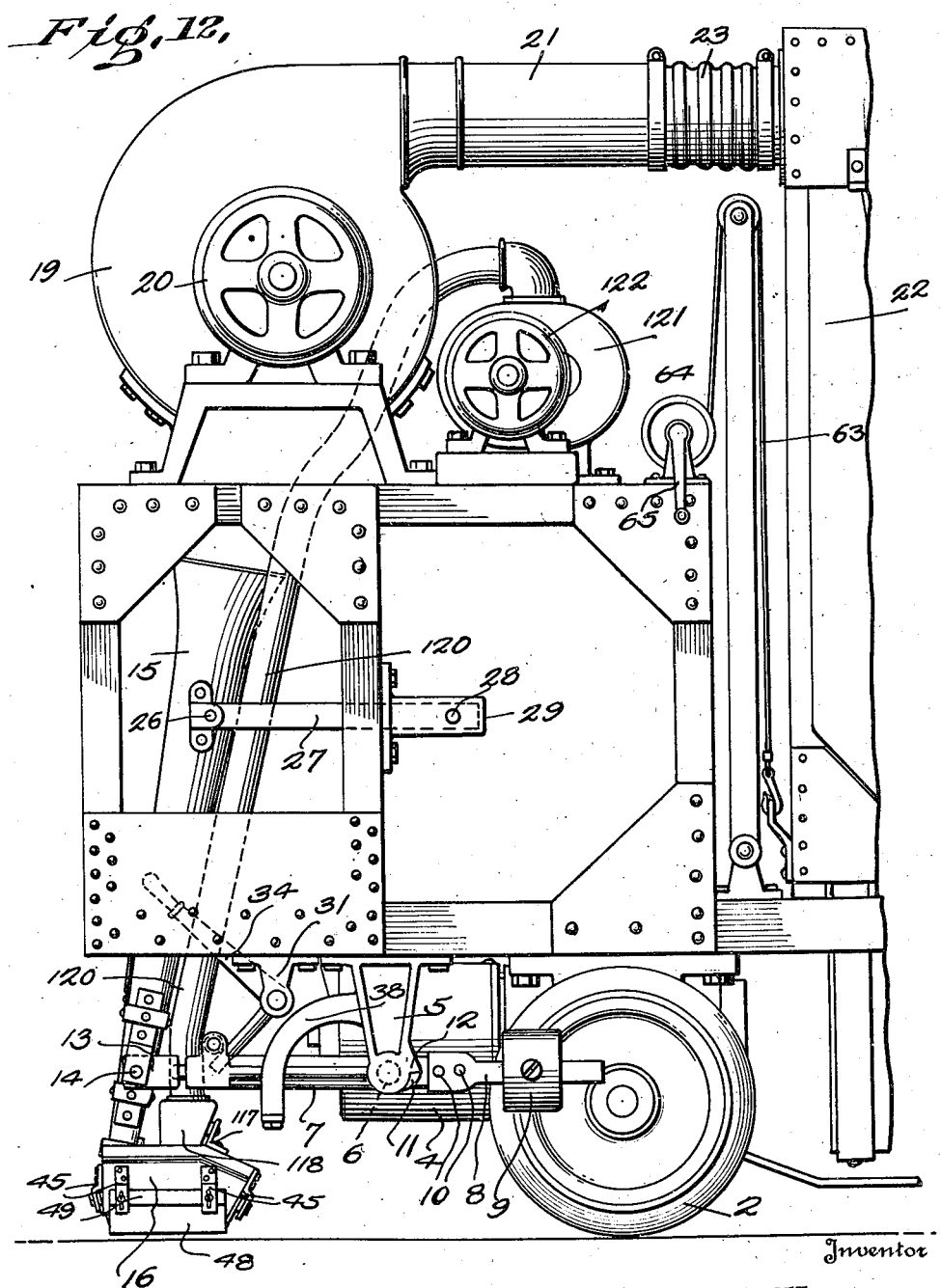

Oct. 29, 1935.  B. KERN  2,018,791
PNEUMATIC CLEANER
Filed Oct. 20, 1930  14 Sheets-Sheet 8
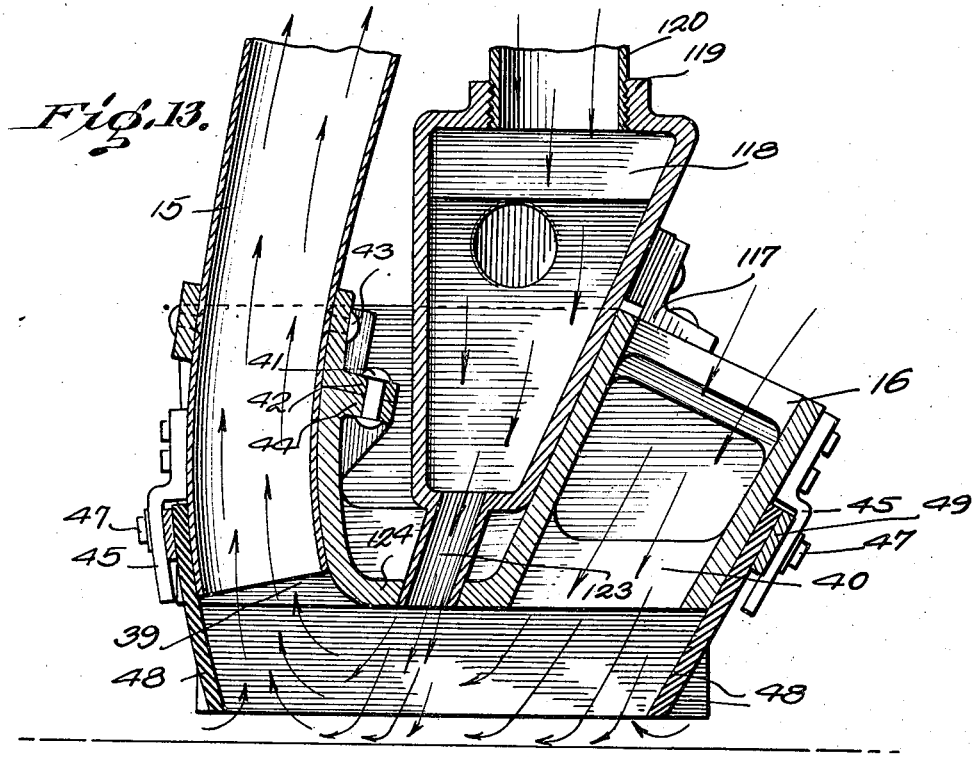
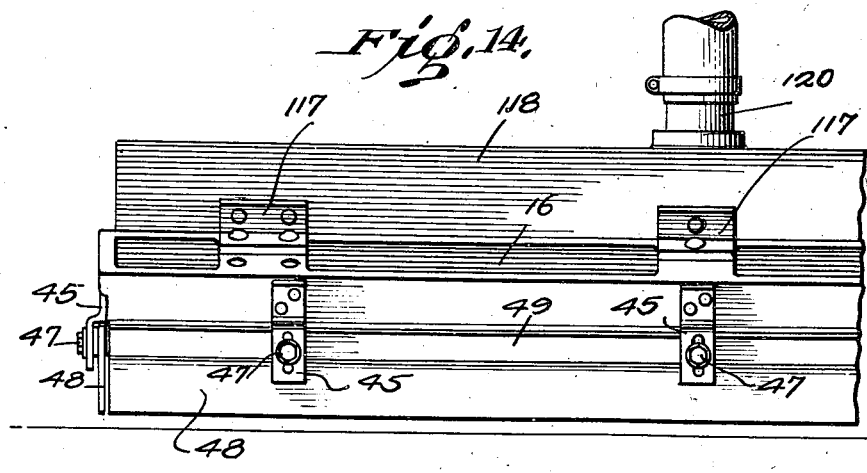
Inventor
Bernard Kern
By Milans & Milans
Attorneys

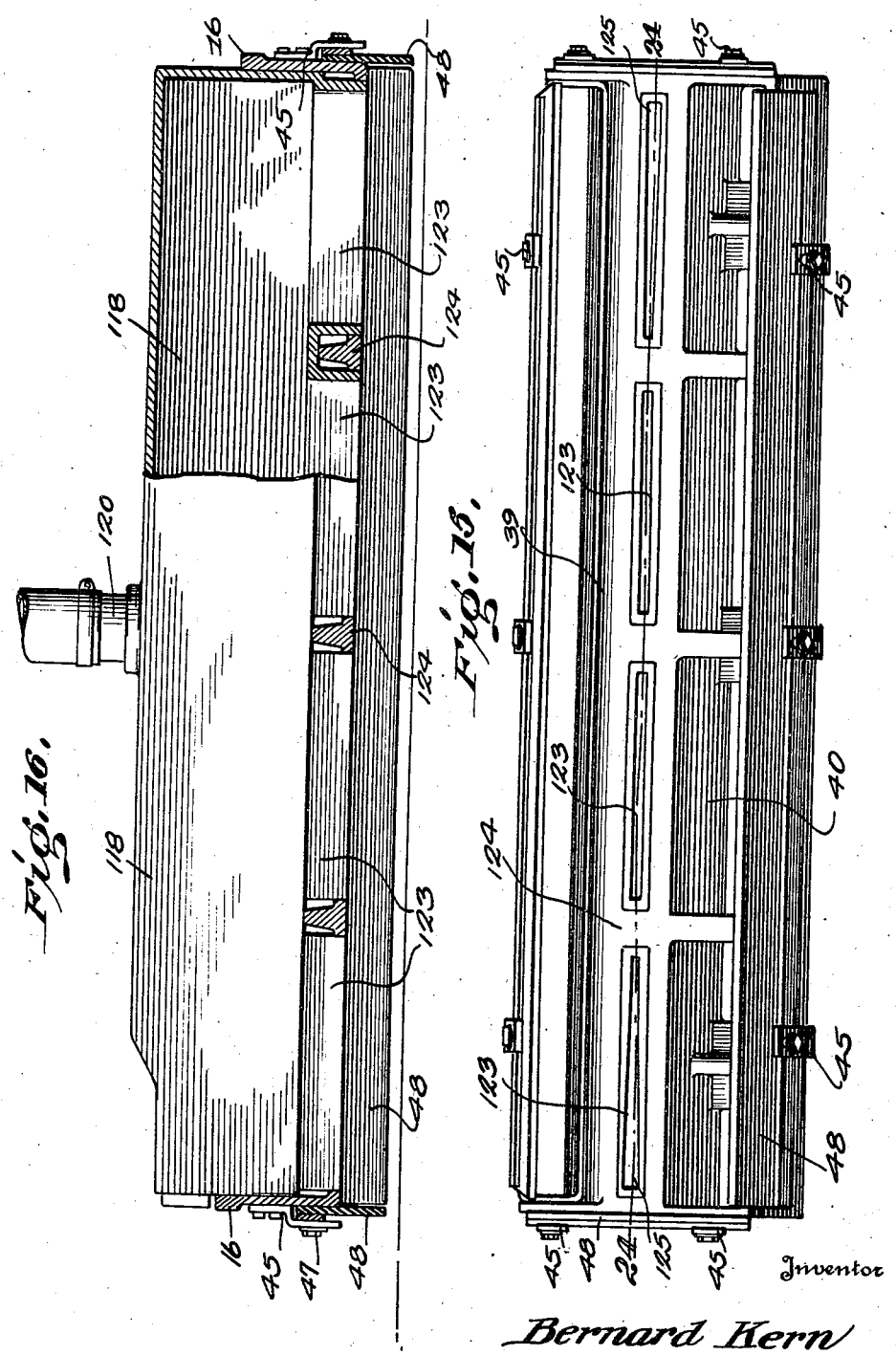

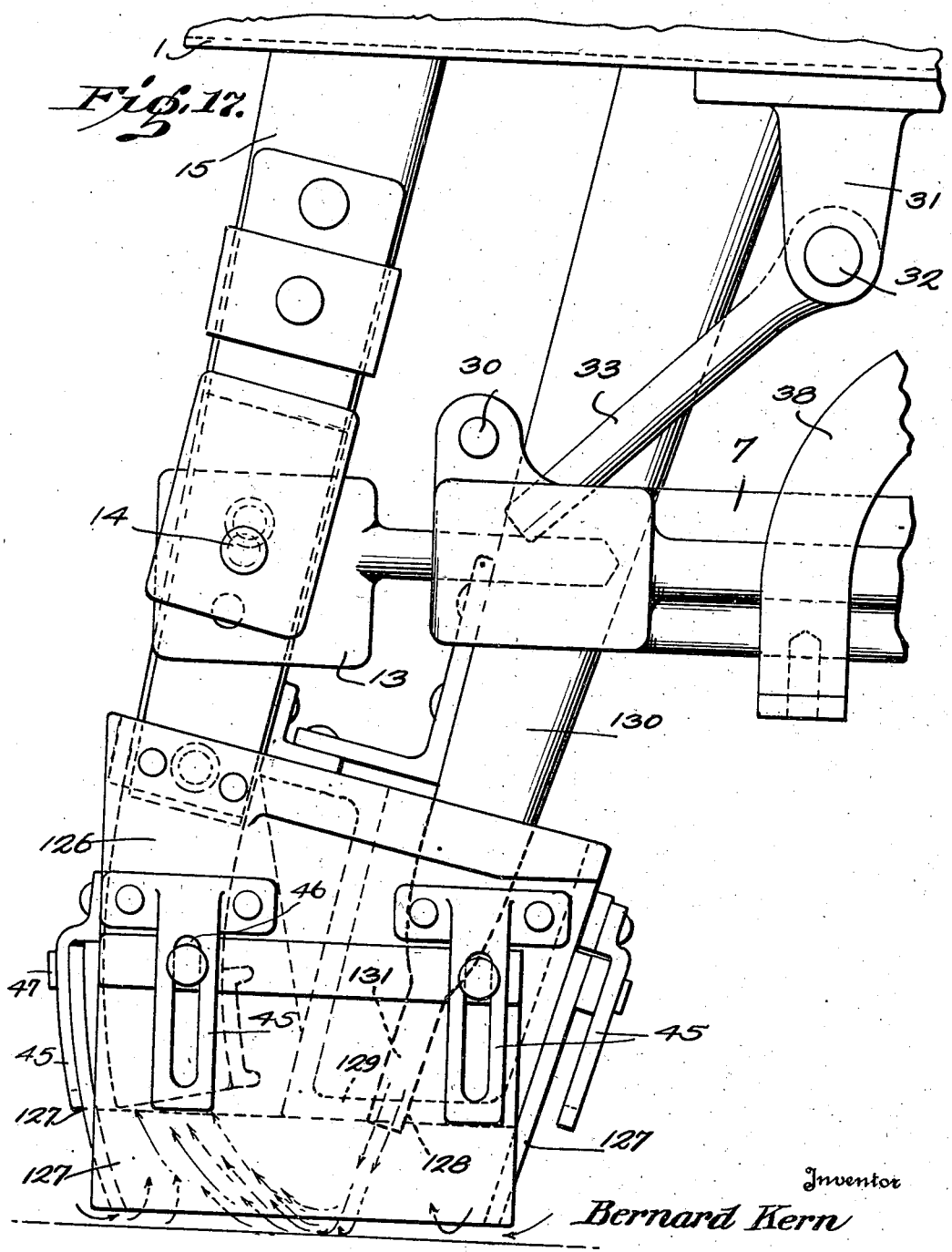

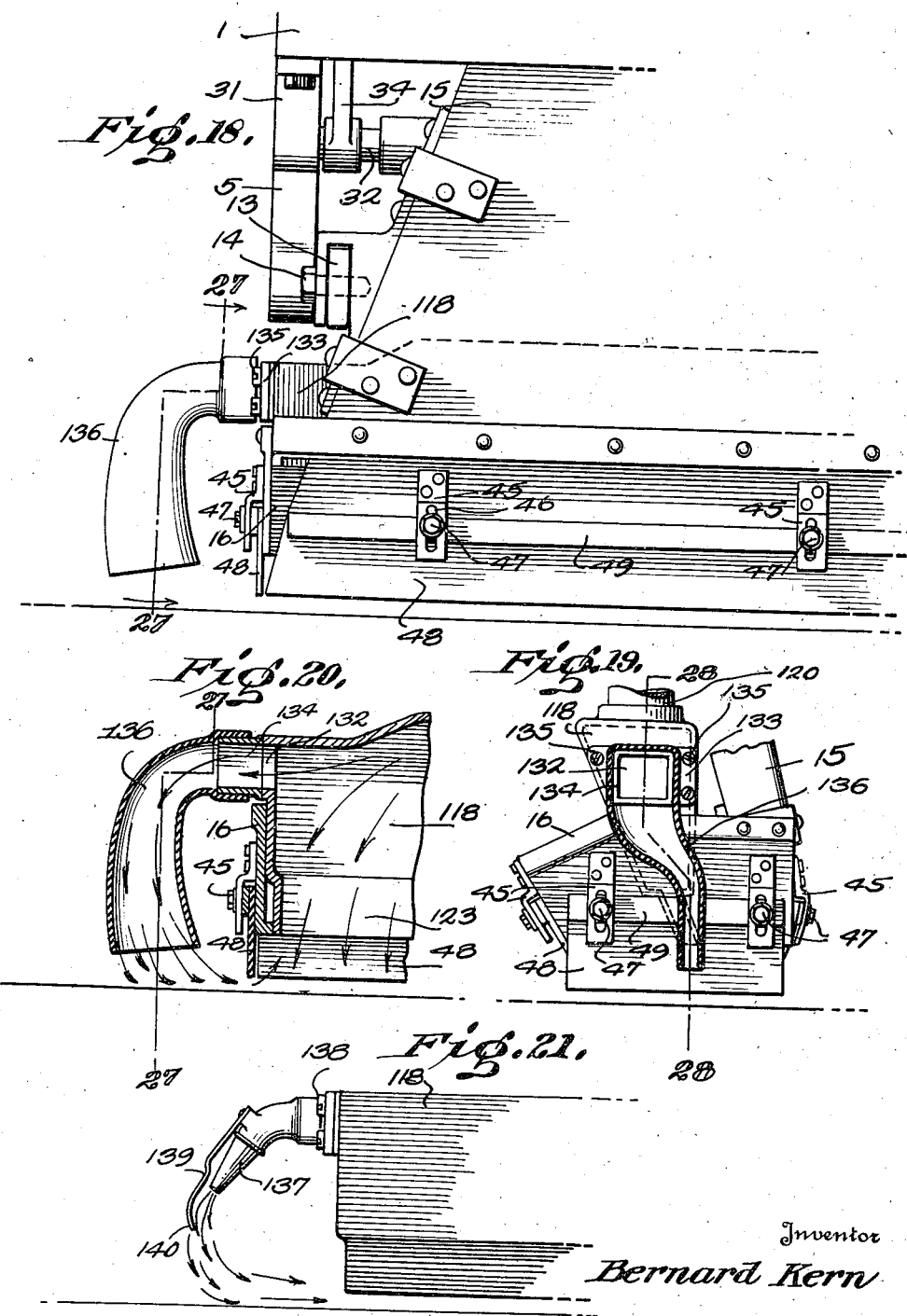

Oct. 29, 1935.  B. KERN  2,018,791
PNEUMATIC CLEANER
Filed Oct. 20, 1930  14 Sheets-Sheet 12
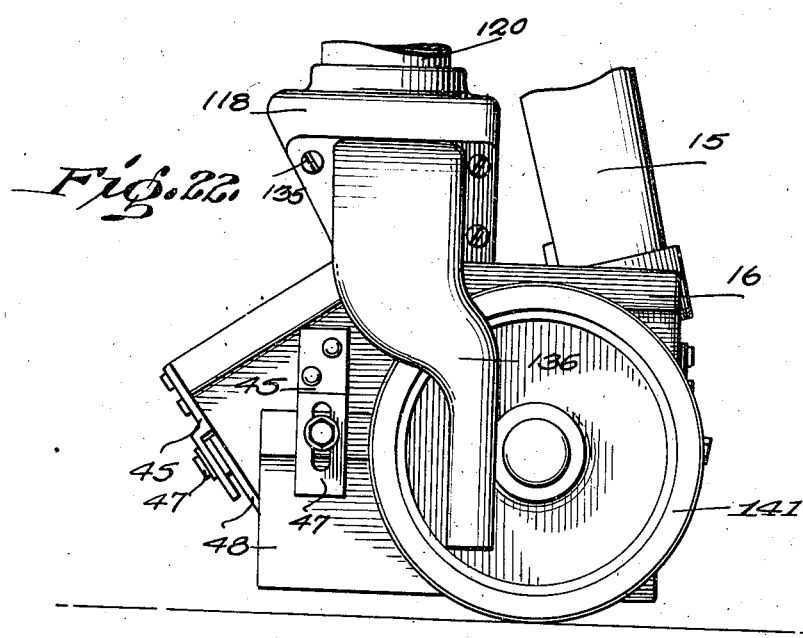
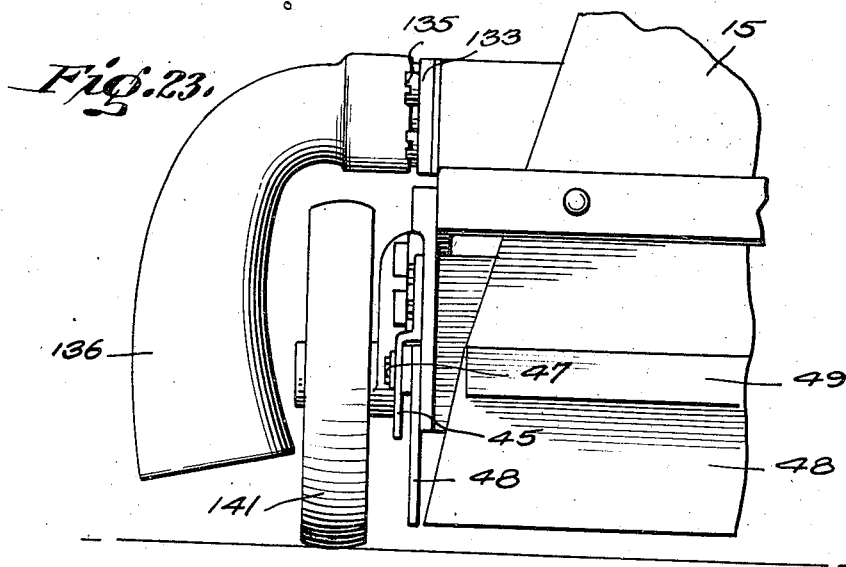
Inventor
Bernard Kern
By Milans & Milans
Attorneys Oct. 29, 1935.     B. KERN     2,018,791
PNEUMATIC CLEANER
Filed Oct. 20, 1930    14 Sheets-Sheet 13
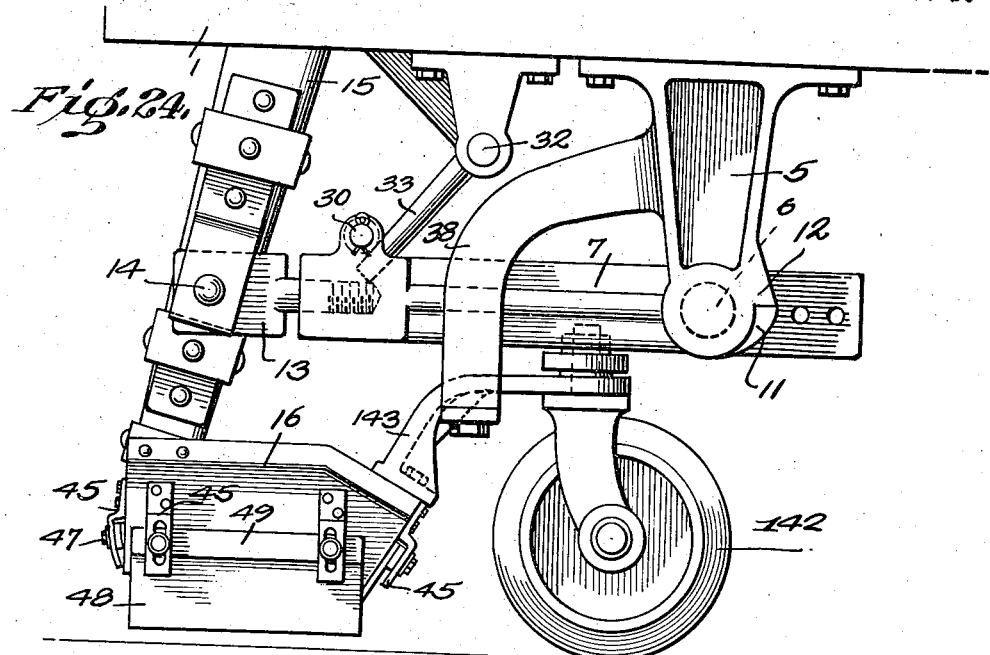
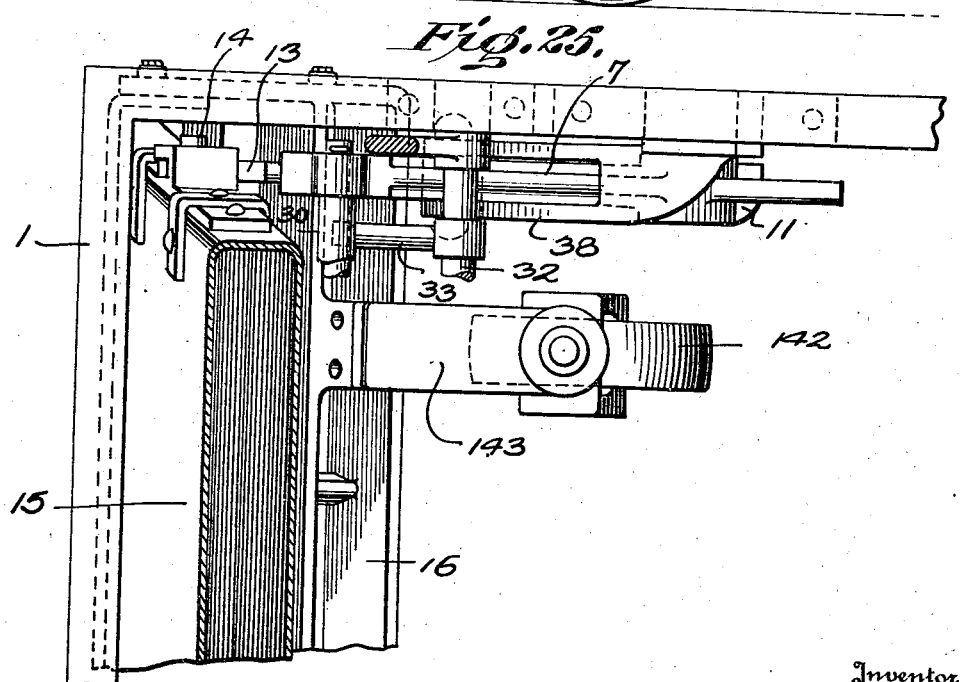
Inventor
Bernard Kern
By Milans & Milans
Attorneys

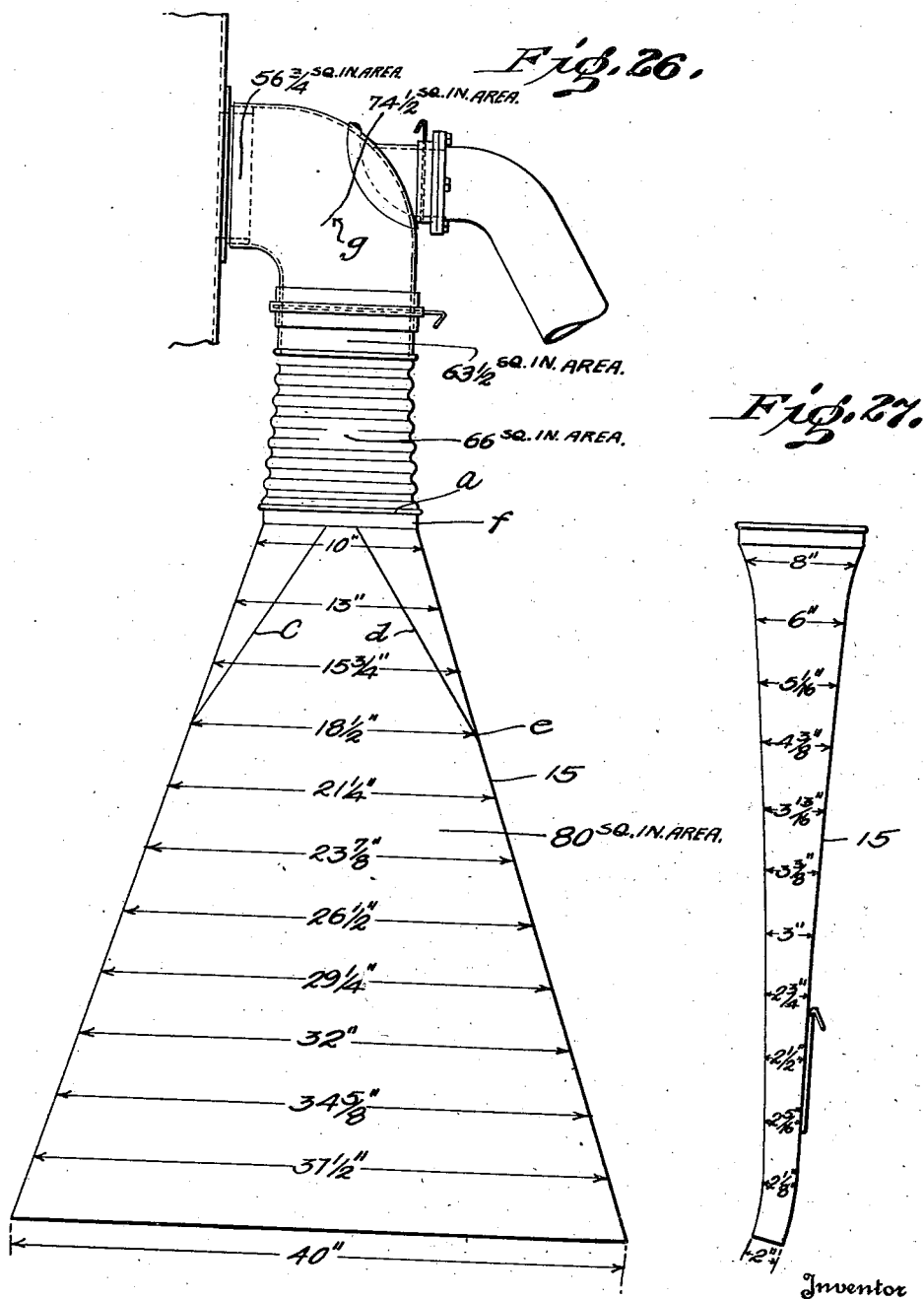

Patented Oct. 29, 1935

2,018,791

UNITED STATES PATENT OFFICE 2,018,791

PNEUMATIC CLEANER

Bernard Kern, Syracuse, N. Y.

Application October 20, 1930, Serial No. 490,053

6 Claims. (Cl. 15—19)

My invention relates to new and useful improvements in pneumatic cleaners and more particularly to such a cleaner adapted to be propelled over the surface to be cleaned and which includes pneumatic means for removing the refuse or débris from the surface and elevating the same for deposit into a receptacle.

The principal object of the invention resides in the provision of a machine of the character described which may be moved over the surface to be cleaned as a unitary construction and while primarily intended for the cleaning of street and road surfaces may be equally as well used for cleaning the floors of factories or mills or the like.

Another object of the invention resides in the provision of a novel form of nozzle or nozzles whereby the refuse or débris is removed from the surface being cleaned and elevated by air currents for deposit into the receptacle.

Another object consists in associating with the suction means, which normally removes the refuse or débris from the surface, when desired, an air blast or discharge of air under pressure, for loosening the débris or refuse from the surface and allowing the same to be readily removed and conveyed by the suction or pneumatic elevating means.

A still further object resides in the provision of means whereby the refuse or débris may be removed from a gutter or similar point, which it is impossible to reach with the normal suction or pneumatic elevating means, such débris or refuse removed from the gutter or similar point being directed into the path of movement of the suction or pneumatic elevating means.

With the above and other objects in view, which will appear as the description proceeds, my invention consists in the novel details of construction, and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:—

Fig. 1 is a side elevation of the assembled machine.

Fig. 2 is a front elevation of the machine.

Fig. 3 is a rear elevation of the machine.

Fig. 4 is a horizontal section on the line 4—4 of Fig. 1 looking in the direction of the arrows.

Fig. 5 is a fragmental front elevation of the lower portion of the suction or pneumatic elevating nozzle.

Fig. 6 is a horizontal section on the line 6—6 of Fig. 5 looking in the direction of the arrows.

Fig. 7 is an end view of the pneumatic or suction elevating nozzle.

Fig. 8 is a transverse section on the line 8—8 of Fig. 6 looking in the direction of the arrows.

Fig. 9 is a section on the line 17—17 of Fig. 4 looking in the direction of the arrows.

Fig. 10 is a section on the line 18—18 of Fig. 9 looking in the direction of the arrows.

Fig. 11 is a section on the line 19—19 of Fig. 10 looking in the direction of the arrows.

Fig. 12 is a fragmental side elevation showing the forward end of a modified form of the machine in which a pressure blower is used in connection with the suction or pneumatic elevating means.

Fig. 13 is a transverse vertical section through the form of nozzle shown in Fig. 12.

Fig. 14 is a fragmental rear elevation of the form of nozzle shown in Figs. 12 and 13.

Fig. 15 is a bottom plan of the form of nozzle shown in Figs. 12, 13 and 14.

Fig. 16 is a section on the line 24—24 of Fig. 15.

Fig. 17 is a side elevation of a slightly modified form of nozzle and suction or elevating means in which an air blast is used for loosening the débris or refuse.

Fig. 18 is a fragmental front elevation of a nozzle having an attachment for removing the refuse or débris from a gutter or similar point.

Fig. 19 is a section on the line 27—27 of Figs. 18 and 20.

Fig. 20 is a section on the line 28—28 of Fig. 19.

Fig. 21 is a fragmental detail showing a slightly modified form of attachment for the nozzle for removing the refuse or débris from a gutter or similar point.

Figs. 22 and 23 are respectively side and front elevations showing a slightly modified form of my invention wherein supporting wheels are provided for the nozzle having a gutter cleaner attached.

Fig. 24 is a side elevation showing a still further modified form of my invention wherein the suction nozzle is provided with supporting wheels or castors.

Fig. 25 is a fragmental top plan of the construction shown in Fig. 24 with parts shown in horizontal section.

Fig. 26 is a front elevation showing the dimensions of the conduit and associated parts connecting the fan to the fan housing; and Fig. 27 is a side elevation showing the dimensions of the conduit.

In the drawings 1 indicates a frame or chassis supported and carried by the wheels 2 and 3, the front wheels 2 being shown, more particularly in Fig. 1 of the drawings, as of greater diameter than the rear wheels 3. The front wheels are driven, in any desired manner, by means of the motor 4 and as this drive forms no particular part of the present invention a detailed illustration and description is not made. Secured to and depending from each side of the frame or chassis 1, adjacent the forward end thereof, is a bracket 5 to which is pivotally connected at 6 an arm or lever 7, the portion of the arm or lever extending rearwardly of the bracket being adapted to receive the recessed end of an auxiliary arm or lever 8 which carries an adjustable counterbalancing weight 9. The auxiliary arm or lever 8 is secured to the end of the arm or lever 7 by means of bolts or other suitable fastenings 10. The levers or arms 7 are also provided with a shoulder or projection 11 which cooperates with a shoulder or projection 12 on the bracket whereby the downward swinging movement of the forward ends of the levers or arms is limited. Extensions 13 from the forward ends of the levers or arms 7 are pivotally connected at 14 to opposite sides of a conduit 15 which is of the shape more particularly illustrated in Figs. 1 and 2 of the drawings. Secured to and communicating with the lower end of the conduit 15 is a nozzle indicated generally at 16 and the upper end of the conduit is secured to the lower end of an elbow joint 17 by means of the flexible coupling member 18, the upper end of the elbow joint being secured to the side of a fan housing 19 and communicating therewith. Within the fan housing is a fan, not shown, which is driven by means of the electric motor 20 supported in the manner shown. The fan housing is provided, adjacent the top, with an opening communicating with the pipe section 21 which is secured to the receptacle indicated generally at 22 by means of the flexible coupling 23, it being understood that the pipe section 21, through means of the coupling 23, communicates with the receptacle 22 and the débris or refuse drawn through the nozzle 16 and conduit 15 by means of the fan within the fan housing 19 will be discharged through the pipe section 21 and coupling 23 into the receptacle 22 to be deposited and separated or filtered in a manner to be later described. The elbow connection 17 is formed with an extension 24, as shown more particularly in Fig. 2 of the drawings, and when desired, different forms of implements or suction devices may be secured thereto. Passage through this extension is normally closed by means of a closure plate 25. Secured at 26, to one side of the conduit 15, is a brace arm 27 for preventing lateral swinging movement of the conduit. The opposite end of the arm or brace 27 is secured at 28 to the bracket 29.

The arms 7 are connected, adjacent their forward ends, by means of a transversely extending rod 30 and rotatably supported in the brackets 31, depending from the frame or chassis 1, is a second transversely extending rod 32 having the arms or projections 33 extending therefrom and normally engaging beneath the rod 30, as shown more particularly in Figs. 1 and 4 of the drawings. Secured to the rod 32, adjacent one end thereof, is a lever 34 by means of which the rod 32 is adapted to be rotated so that the arms 33 in turn will raise the rod 30 and the nozzle 16 and conduit 15. Normally the lever 34 extends forwardly, as shown more particularly in Figs. 1 and 10 of the drawings and is pulled rearwardly to the position shown in dotted lines in Fig. 10 to raise the forward ends of the arms 7 and the conduit connected thereto. To hold the lever in this rearward position a latch 35 is pivotally connected to one side of the frame or chassis 1 at 36 and one end thereof is engaged with a pin or projection 37 extending from the face of the lever. The arms 7 operate in the guides 38, as shown more particularly in Figs. 1 and 9 of the drawings.

The nozzle shown generally at 16, is of the form illustrated more particularly in Figs. 7 and 8 of the drawings and includes the passages 39 and 40, the passage 39 receiving the lower end of the conduit 15 which is secured thereto by the rivets 41 passing through the plate 42, secured to the conduit by means of the rivets 43, and the flange or extension 44 formed on the nozzle. Secured to the forward and rear faces of the nozzle and to the ends thereof, are the brackets 45 each of which has an elongated opening 46 to receive a bolt 47 whereby the flexible, preferably rubber, aprons 48 are adjustably connected to the nozzle, the lower ends of these aprons being normally spaced from the surface to be cleaned as is quite clearly illustrated in the drawings. Metal plates 49 are secured to the upper edges of each of the aprons and the bolts 47 are carried thereby. The aprons are sufficiently flexible so as to give when any obstructions are encountered.

It will be understood that the passage 40 communicates with the top of the nozzle, as shown more particularly in Figs. 6 and 8, Fig. 6 showing a top plan of the nozzle. It will be further noted that the passage 40 extends inwardly at an angle for a purpose which will be described.

As the fan within the housing is rotated it creates suction through the conduit 15 and air is drawn into the nozzle through the passage 40 and travels downwardly and, as shown by the arrows in Fig. 8, turns towards the passage 39 communicating with the conduit. The incoming air through the passage 40 strikes the surface being cleaned with such force as to agitate the débris or refuse and carry the same into the conduit from which it is discharged into the receptacle 22. The volume of air in turning, as shown by the arrows, follows the lines of least resistance and in the instance shown the least resistance is along the rear wall of the nozzle. The angle at which the passage 40 extends allows the air to strike the surface in such a manner that an expansion of air takes place from the blow due to its high velocity and this expansion tends to raise the débris or refuse slightly so that the volume of air may get beneath the same for buoyancy and to draw it up into the conduit. The manner in which the air strikes the surface and raises the débris acts in the same manner and takes the place of the ordinary revolving brush commonly used in sweepers or cleaners and which raises the débris so that the air may get under it for buoyancy.

As the air strikes the surface being cleaned there will be a certain amount of loss in the velocity speed of the air due to the blow which retards it and this is compensated for by raising the lower ends or edges of the aprons 48 slightly above the surface and allow the fan to draw sufficient air from the surface which makes the cleaner more efficient because of the agitation of the débris from the current of air entering the nozzle through the passage 40 which is caught by the inrushing air from the surface. From this explanation it is thought that the construction and manner in which the nozzle acts to remove the débris or refuse from the surface will be clearly understood.

In Figs. 26 and 27 of the drawings I have illustrated the detailed dimensions of the conduit 15, elbow joint 17, and flexible connection 18. As shown in these two figures of the drawings the mouth or inlet end of the conduit has an area of eighty square inches being forty inches wide and two inches in breadth or thickness. The succeeding lines give the width and area of the conduit at the point that they are shown, spaced approximately four inches apart, and at the neck $a$ or the outlet of the conduit, the area is sixty-six square inches. The lines $c$ and $d$ indicate that the end of the conduit is rounded beginning at the line $e$ and extending to the collar $f$. The area through the flexible joint 18 is also sixty-six square inches after having made proper allowance for the folds that are in the joint to allow for the adjustment of the conduit and also for the rough surface of the wall of the joint. At the inlet or lower end the elbow joint 17 has an area of sixty-three and one-half square inches and at the girt or point $g$ the area is enlarged to seventy-four and one-half square inches and at the inlet or top the area is fifty-six and three-fourths square inches. The increased area of the elbow joint at $g$ is for the purpose of allowing for the resistance of the short-radius in the throat. This short radius offers a great resistance. The increased area at the point $g$ allows for a slight expansion so the air will have a longer radius for the turn into the fan housing and as the air will always follow the lines of least resistance the larger portion of air will follow along the outside wall and in turning it will allow more room to make the turn with less resistance.

The receptacle 22 is provided with side doors 50 hingedly connected at the top as shown at 51 and provided at the bottom with the latch members 52. These side doors 50 allow for entrance into the receptacle to gain access to the filtering or separating members positioned therein. The receptacle is also provided with a rear door 53 hingedly connected at 54 and provided with the bottom latch member 55 and auxiliary latch members 56, these auxiliary latch members being operated through means of a single lever 57 pivotally mounted at 58. The lever is connected to each of the auxiliary latch members 56 by means of a rod 59 and the swinging movement of the lever is limited by a pin or projection 60 which operates in an elongated opening 61 formed therein. This rear door 53 allows access to the receptacle at the bottom thereof where the deposits of débris or refuse have been made and also allows for the dumping of the receptacle, it being understood that the receptacle will be pivotally connected to the frame or chassis 1 at 62 and the forward end thereof may be raised by means of a cable or rope 63 having one end connected to the receptacle and the opposite end adapted to be wound upon a drum 64 operated through means of the hand lever 65.

In Figs. 12 to 16 inclusive of the drawings I have shown a slightly modified form of nozzle adapted to be secured to the lower end of the conduit 15 and in which a blast of air is used and discharged onto the surface being cleaned to aid in loosening and releasing the débris to be conveyed through the conduit in the manner previously described in connection with the type of nozzle shown more particularly in Figs. 5 to 8 inclusive and in which said blast of air is provided by a motor operated compressor supported by the machine. The form of nozzle illustrated in Figs. 12 to 16 inclusive being of the same construction as that disclosed in Figs. 5 to 8 inclusive with the exception of the attachment whereby the blast of air is secured I will use the same reference characters to denote those parts of the nozzle shown in Figs. 12 to 16 inclusive corresponding to similar parts disclosed in Figs. 5 to 8 inclusive. Secured to the nozzle, by means of a bracket 117, is an air chamber 118 having a threaded opening 119 in its top to receive the lower end of a pipe 120, the upper end of the pipe being connected to and communicating with a compressor housing 121, the compressor being operated by the electric motor 122. Depending from the bottom of the chamber 118 are the passages 123 which, as shown more particularly in Figs. 15 and 16 are elongated and pass through openings formed in the wall 124 of the nozzle. As shown more particularly at 125 in Fig. 15 of the drawings the openings of the end passages 123 are of somewhat greater width at their outer ends for a purpose which will be described.

The form of nozzle, with the air blast attachment, shown in Figs. 12 to 16 inclusive is adapted for somewhat heavier cleaning than the form of nozzle shown in Figs. 5 to 8 inclusive and is particularly adapted for cleaning roads, pavements, shop floors or the like, where the refuse or débris is mixed with iron chips or any kind of heavy material. The passages 123, as shown more particularly in Fig. 13 are arranged at an angle so that the air discharged therethrough when striking the surface to be cleaned will loosen and raise the heavy particles of material and turn them over into the buoyant inrunning volume of air caused by the suction means. The width of the openings in the end passages is increased as shown at 125 to provide for occasions where the refuse or débris is not uniformly distributed such as where the débris or refuse is much heavier from a curb or the like extending outwardly towards the center of a street or road bed.

In Fig. 17 of the drawings I have illustrated a still further modified form of the invention in which the nozzle is shown at 126 secured to the lower end of the conduit 15. Flexible aprons 127 are secured to the sides and ends of the nozzle and the lower edges thereof will be normally spaced above the surface to allow air to be drawn therebeneath by the suction created through the conduit 15. An opening 128 is formed in the wall 129 and extends longitudinally of the nozzle. At 130 I have shown a conduit adapted to be connected to the air compressor 121 shown more particularly in Fig. 12 of the drawings and this conduit is provided at its lower end with a reduced passage or spout 131 which passes through the opening 128 at an angle as shown. When suction is created through the conduit 15 air will be drawn beneath the lower edges of the aprons 127 and the débris or refuse will be carried up through the conduit. The air blast discharged through the conduit 130 and extension 131 thereof will be discharged against the surface as shown by the arrows and will loosen the débris or refuse and turn the same into the current of air created by the suction through the conduit 15.

In Figs. 18, 19 and 20 I have illustrated, attached to that form of nozzle disclosed in Figs. 20 to 24 inclusive, a device whereby débris or refuse may be readily blown from a gutter or corner of any character to position to be operated upon by the suction created through the nozzle. It will be appreciated that at times it will be impossible to operate the machine sufficiently close to a gutter or the like to allow the proper removal of the débris or refuse from the gutter and for this purpose I provide an attachment for the nozzle which will extend from one end thereof and throw a blast of air onto the surface to be cleaned, adjacent the gutter or the like, and deliver the refuse or débris in position to be operated upon by the nozzle proper. The nozzle disclosed in Figs. 12 to 16 inclusive will be provided in that end which normally operates adjacent the gutter with an opening 132 which may be normally closed in any desired manner. As shown more particularly in Figs. 18 and 20 of the drawings this opening 132 will be positioned adjacent the top of the nozzle and when it is desired to attach the "gutter blower" the normal closure will be removed and a plate 133 having a sleeve portion 134 will be secured to the end of the nozzle, with the sleeve in alignment with the opening, by means of the screws 135 or other suitable fastenings. Attached to this sleeve portion 134 is a blower member or nozzle 136 of the shape more particularly illustrated in Figs. 19 and 20 of the drawings, it being shaped so that the air discharged therethrough will be directed towards the end of the nozzle and against the surface to be cleaned. The movement of the air currents is indicated by the arrows shown in Fig. 20 and a portion of the air, under pressure, discharged into the air chamber 118 will be discharged through the nozzle or blower member. The air blast through the nozzle 136 will loosen the débris or refuse adjacent the gutter and deliver the same in the path of movement of the nozzle proper whereby it will be drawn through the suction conduit 15 and delivered into the refuse receptacle. Preferably the nozzle or blower member will be formed of flexible material, such as rubber, so that when it contacts with the curb or other object it will yield sufficiently to prevent breakage.

In Fig. 21 I have shown a modified form of gutter blower in which the nozzle 137 is secured to the end of the suction nozzle by means of the screws 138 or other suitable fastenings and a deflector 139 is secured to the nozzle 137 with a portion 140 extending in the path of movement of the air currents ejected from the nozzle 137. The air passing through the nozzle 137 will be directed by the deflector 139, and more particularly the portion 140 thereof, towards the end of the suction nozzle and the refuse or débris in the gutter will be loosened and discharged into the path of movement of the suction nozzle through which it is drawn and delivered through the conduit 15 into the refuse receptacle.

In that form of my invention illustrated in Figs. 1 to 21 inclusive of the drawings I have not shown any means for supporting the nozzle from the surface to be cleaned and have merely relied upon the means whereby the nozzle is connected to the machine for spacing the bottom thereof a sufficient distance from the surface to allow proper operation. In Figs. 22 to 25 inclusive I have shown means for directly supporting the nozzle from the surface over which the machine is operated. In Figs. 22 and 23 I show a wheel 141 secured to the ends of the nozzle when the gutter blower or attachment is used and the wheels are positioned between the ends of the nozzle and the attachment as shown more particularly in Fig. 23. In Figs. 24 and 25 I have shown a wheel 142 secured adjacent each end of the nozzle by means of the brackets 143, the brackets positioning the wheels to the rear of the nozzle. In Figs. 22 and 23 I have shown the wheels as supporting that type of nozzle disclosed in Figs. 12 to 16 inclusive whereas in Figs. 24 and 25 I have shown the wheels as supporting that form of nozzle shown more particularly in Figs. 5 to 8 inclusive. The wheels disclosed in Figs. 22 to 25 inclusive are preferably used only when cleaning floors or pavements, or other surfaces, where there is a crown and where it is necessary to keep the distance between the surface and nozzle constant.

From the above detail description it is thought that the construction and operation will be understood and it will be seen that I have provided a cleaning machine of the character described employing means whereby the refuse and débris may be readily removed from the surface and conveyed by suction or pneumatic currents to a point of deposit, the point of deposit being illustrated as a receptacle. I have also provided novel means whereby a blast of air may be directed against the surface, being cleaned, to loosen material therefrom and to position the same to the suction currents of air to be operated upon thereby. Further I have provided novel means whereby the surfaces adjoining a gutter or wall may be readily cleaned and whereby the nozzle may be readily supported to provide a constant distance between the operating face of the nozzle and the surface being cleaned.

Having fully described my invention what I claim as new and desire to secure by Letters Patent is:—

1. A cleaning machine of the character described including a conduit, an elongated nozzle carried and supported by the conduit with its lower face positioned above the surface being cleaned, said nozzle having an elongated passage along each longitudinal edge, the lower end of the conduit being received in one of the elongated passages, the other elongated passage extending downwardly and inwardly with its lower end positioned a substantial distance from the inlet end of the conduit to direct downwardly directed air currents onto the surface being cleaned, and means for creating suction through the conduit to in turn draw air under the edges of the nozzle and through the downwardly and inwardly directed elongated passage over a substantial area of the surface being cleaned to remove and support refuse for discharge into the conduit.

2. A cleaning machine of the character described including a conduit, an elongated nozzle carried and supported by the conduit with its lower face positioned above the surface being cleaned, said nozzle having an elongated passage along each longitudinal edge, flexible aprons connected to each side and end of the nozzle with their lower edges spaced in close proximity to the surface being cleaned, the lower end of the conduit being received in one of the elongated passages, the other elongated passage extending downwardly and inwardly with its lower end positioned a substantial distance from the inlet end of the conduit to direct downwardly directed air currents onto the surface being cleaned, and means for creating suction through the conduit to in turn draw air under the edges of the flexible aprons and through the downwardly and inwardly directed elongated passage over a substantial area of the surface being cleaned to remove and support refuse for discharge into the conduit.

3. A cleaning machine of the character described including a conduit, an elongated nozzle carried and supported by the conduit with its lower face positioned above the surface being cleaned, said nozzle having an elongated passage along each longitudinal edge, flexible aprons adjustably connected to each side and end of the nozzle with their lower edges spaced in close proximity to the surface being cleaned, the lower end of the conduit being received in one of the elongated passages, the other elongated passage extending downwardly and inwardly with its lower end positioned a substantial distance from the inlet end of the conduit to direct downwardly directed air currents onto the surface being cleaned, and means for creating suction through the conduit to in turn draw air under the edges of the flexible aprons and through the downwardly and inwardly directed elongated passage over a substantial area of the surface being cleaned to remove and support refuse for discharge into the conduit.

4. A cleaning machine of the character described including a conduit, an elongated nozzle carried and supported by the conduit with its lower face positioned above the surface being cleaned, said nozzle having an elongated passage along each longitudinal edge, the lower end of the conduit being received in one of the elongated passages, the other elongated passage extending downwardly and inwardly with its lower end positioned a substantial distance from the inlet end of the conduit to direct downwardly directed air currents onto the surface being cleaned, means carried by the nozzle and positioned between the elongated passages for directing air currents onto the surface being cleaned, and means for creating suction through the conduit to in turn draw air under the edges of the nozzle and through the downwardly and inwardly directed elongated passage over a substantial area of the surface being cleaned to remove and support refuse for discharge into the conduit.

5. A cleaning machine of the character described including a conduit, an elongated nozzle carried and supported by the conduit with its lower face positioned above the surface being cleaned, said nozzle having an elongated passage along each longitudinal edge, the lower end of the conduit being received in one of the elongated passages, the other elongated passage extending downwardly and inwardly with its lower end positioned a substantial distance from the inlet end of the conduit to direct downwardly directed air currents onto the surface being cleaned, means for creating suction through the conduit to in turn draw air under the edges of the nozzle and through the downwardly and inwardly directed elongated passage over a substantial area of the surface being cleaned to remove and support refuse for discharge into the conduit, and a member connected to and extending beyond the end of the nozzle for discharging air currents to the surface being cleaned beyond the end of the nozzle and directing the same towards the end of the nozzle to be drawn therethrough and into the conduit.

6. A cleaning machine of the character described including a conduit, an elongated nozzle carried and supported by the conduit with its lower face positioned above the surface being cleaned, said nozzle having an elongated passage along each longitudinal edge, the lower end of the conduit being received in one of the elongated passages, the other elongated passage extending downwardly and inwardly with its lower end positioned a substantial distance from the inlet end of the conduit to direct downwardly directed air currents onto the surface being cleaned, means carried by the nozzle and positioned between the elongated passages for directing air currents onto the surface being cleaned and towards the passage receiving the end of the conduit, and means for creating suction through the conduit to in turn draw air under the edges of the nozzle and through the downwardly and inwardly directed elongated passage over a substantial area of the surface being cleaned to remove and support refuse for discharge into the nozzle.

BERNARD KERN.